United States Patent

[11] 3,616,872

[72] Inventor Frank A. Taylor
236 Australian Ave., Palm Beach, Fla. 33480
[21] Appl. No. 848,795
[22] Filed Aug. 11, 1969
[45] Patented Nov. 2, 1971

[54] ELECTRIC AUTOMOBILE
3 Claims, 12 Drawing Figs.

[52] U.S. Cl. ..................................... 180/65 R, 105/51, 296/31 P
[51] Int. Cl. ..................................... B60l 11/18
[50] Field of Search ............................ 180/65, 68.5, 60; 105/49, 50, 51; 296/31 P

[56] References Cited
UNITED STATES PATENTS
547,441  10/1895  Libbey ........................ 180/34
1,095,967  5/1914  Lister ........................ 180/65 UX
2,167,376  7/1939  Schulz ........................ 296/31 P
2,269,451  1/1942  Ford ........................ 296/31 P X
2,814,524  11/1957  Porsche et al. ................ 296/31 P
3,493,068  2/1970  Albright ..................... 180/65
3,521,722  7/1970  Dimonte ..................... 180/65

Primary Examiner—Leo Friaglia
Assistant Examiner—Milton L. Smith
Attorneys—A. Yates Dowell and A. Yates Dowell, Jr.

ABSTRACT: A motor vehicle driven by one or more electric motors supplied with power from a plurality of rechargeable energy cells which are permanently encased within the body structure. An auxiliary source of power is provided to recharge one of the energy cells while another energy cell is supplying power to the electric motor.

PATENTED NOV 2 1971 3,616,872
SHEET 1 OF 3
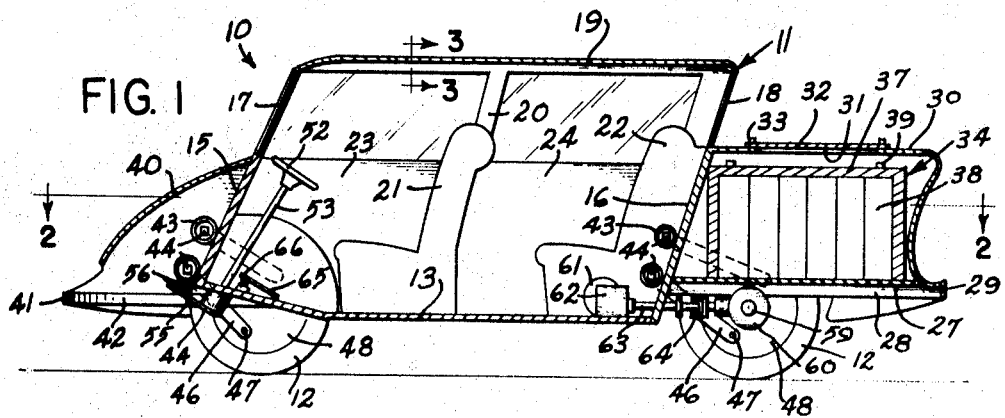
FIG. 1
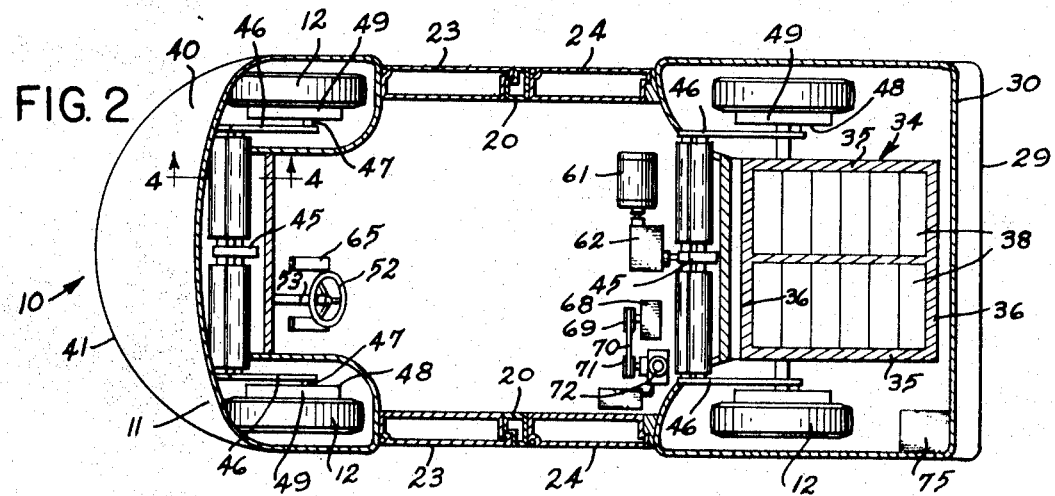
FIG. 2
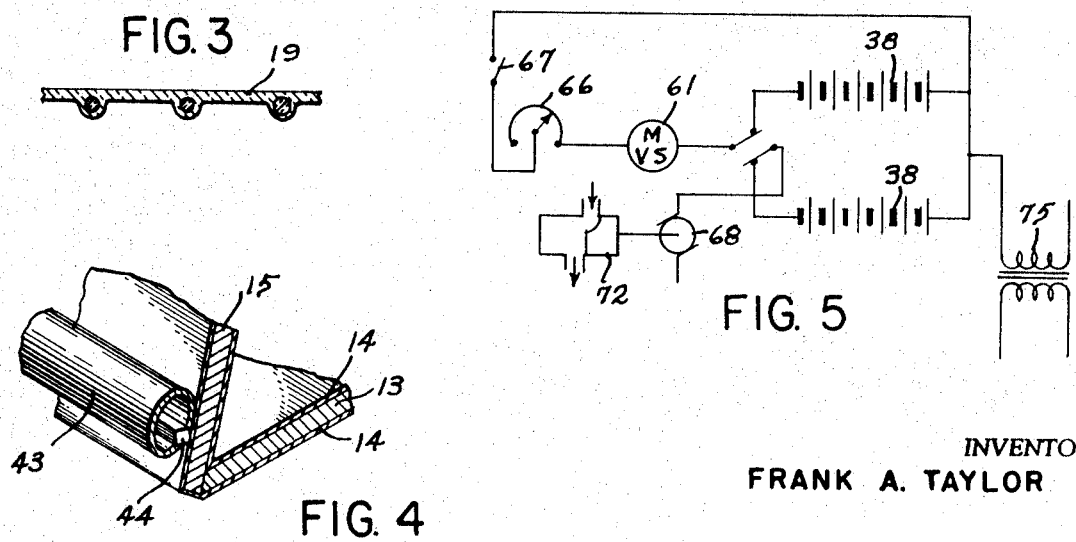
FIG. 3
FIG. 4
FIG. 5
INVENTOR
FRANK A. TAYLOR
BY
ATTORNEY

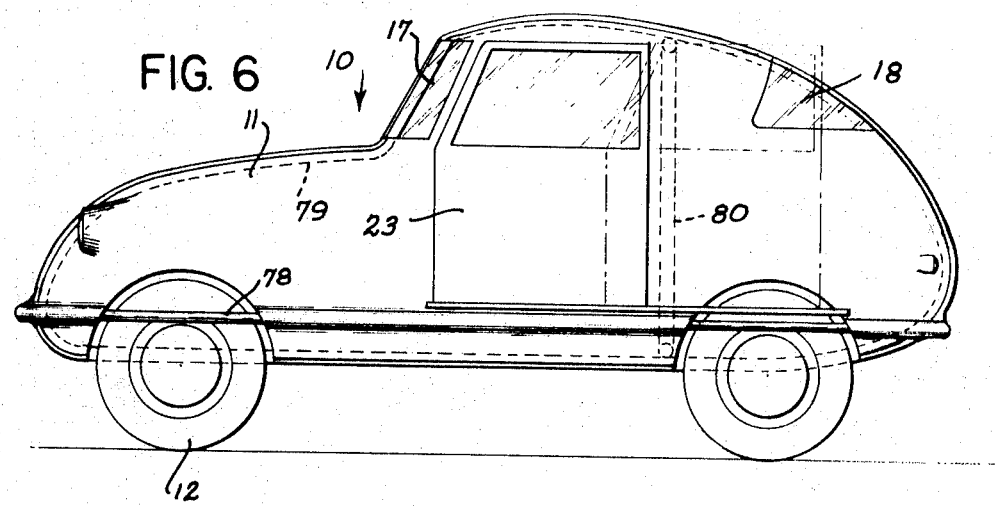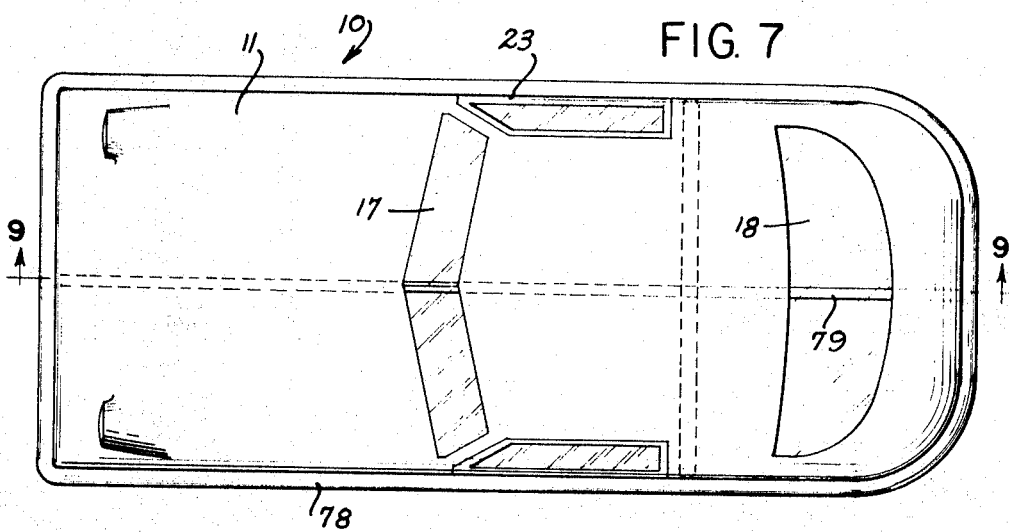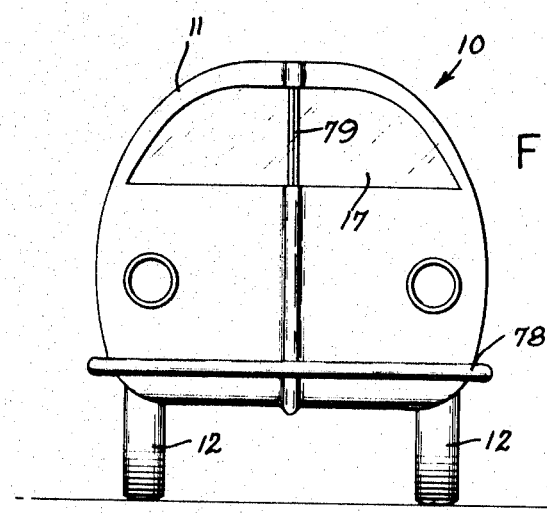

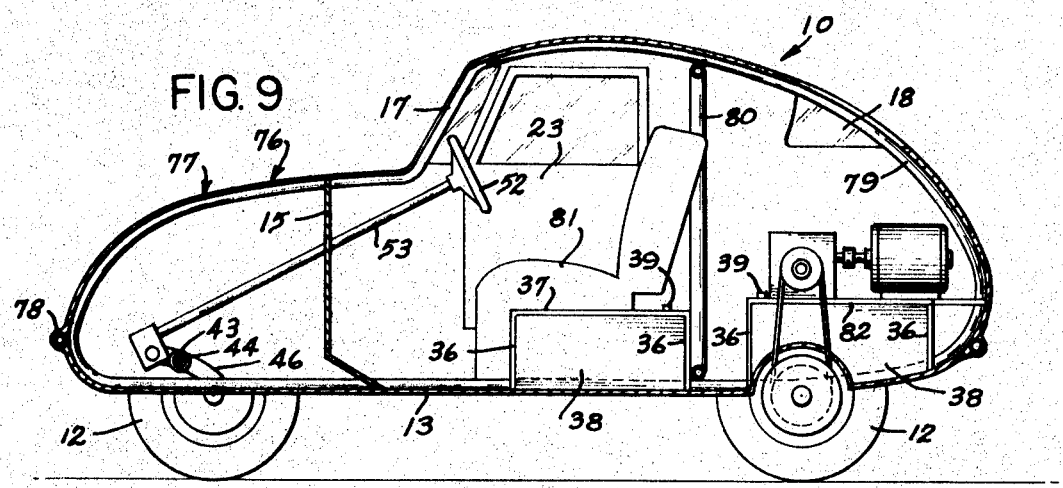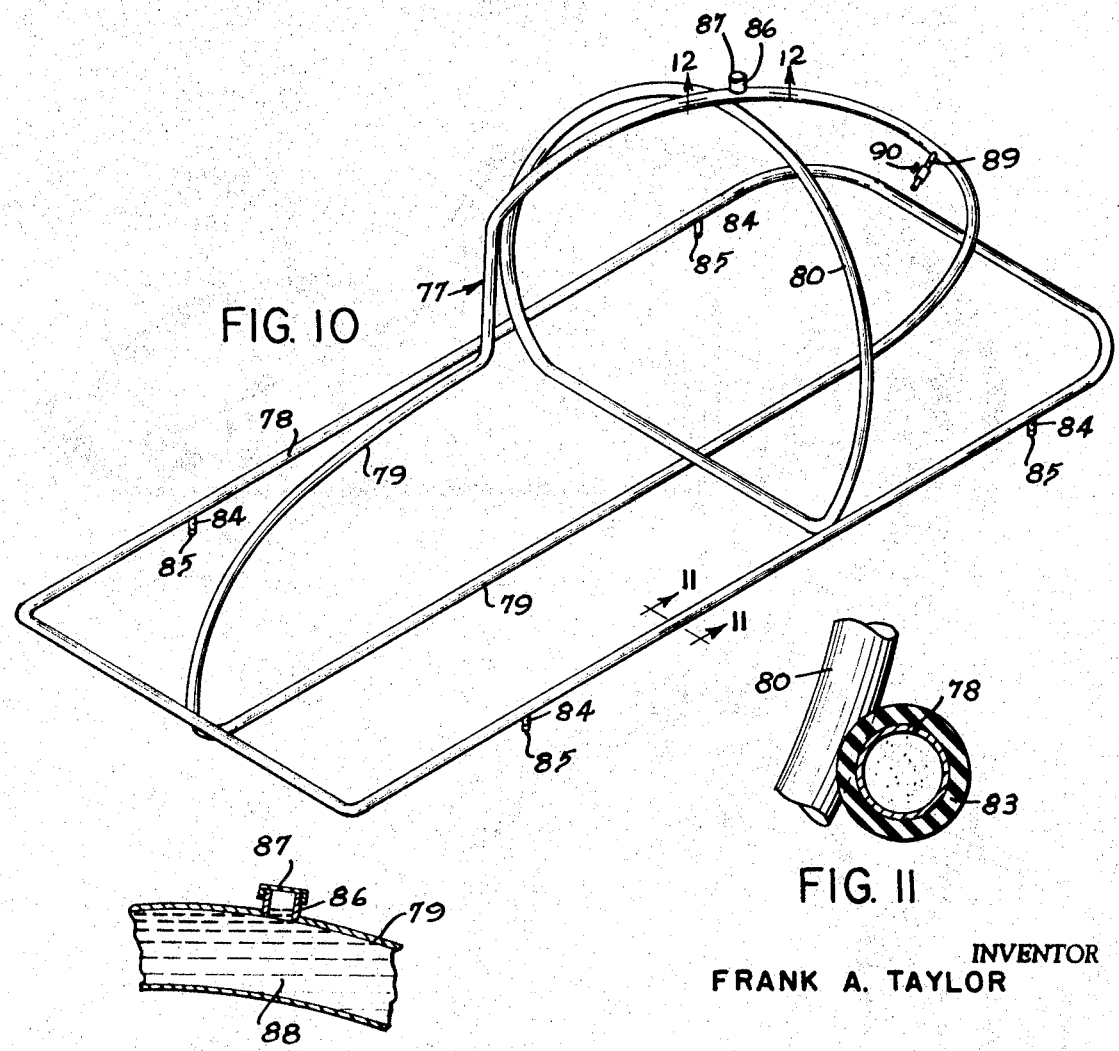

3,616,872

ELECTRIC AUTOMOBILE

BACKGROUND OF THE INVENTION

1. Field of the Invention

This invention relates to automotive vehicles of various kinds and relates particularly to a relatively small lightweight vehicle driven by one or more electric motors supplied with electrical energy from a rechargeable energy cell.

2. Description of the Prior Art

In the early days of automobile manufacture, many attempts were made to produce automobiles driven by an electric motor; however, these automobiles did not meet with success since they were unable to keep pace with automobiles powered by internal combustion engines, primarily because of inefficiency of the motor as well as the problem of storing sufficient energy in batteries or the like to maintain the automobile in operating condition for extended periods of time. Subsequently the electric automobile substantially disappeared from the market even though the electric automobile had certain inherent advantages over automobiles powered by internal combustion engines. With the advent of more efficient electric motors and more efficient storage batteries, some efforts have been made to produce an electric automobile, at least for limited uses such as short trips at low speeds. These recent innovations have not been successful due to the limited range of the vehicles, as well as due to the fact that the storage batteries which are expensive have been easily stolen. Also in most cases a single storage battery has been provided which was insufficient to supply electrical energy over extended periods and which could be recharged only under special conditions.

SUMMARY OF THE INVENTION

The present invention is a relatively small lightweight automobile driven by at least one electric motor and supplied with electric current from multiple, selectively usable, energy cells or storage batteries. The body of the automobile preferably is constructed of relatively strong high-impact material such as a combination of waterproof plywood and fiber glass and may be constructed so that a separate frame is not needed, or may be provided with a strong frame of unitary construction onto which fiber glass is molded into an integral unit. A plurality of energy cells are permanently molded within the body so that such cells or batteries cannot be stolen.

It is an object of the invention to provide a lightweight electrically driven automobile having a plurality of selectively usable banks of energy cells and means for recharging one bank of cells while another bank of cells is discharging electrical energy for operating the vehicle.

Another object of the invention is to provide an electric automobile having a plurality of energy cells that are permanently molded into the body of the automobile so that they cannot be stolen.

BRIEF DESCRIPTION OF THE DRAWINGS

FIG. 1 is a vertical section illustrating one application of the invention.

FIG. 2 is a section on the line 2—2 of FIG. 1.

FIG. 3 is an enlarged fragmentary section on the line 3—3 of FIG. 1.

FIG. 4 is an enlarged fragmentary perspective on the line 4—4 of FIG. 2.

FIG. 5 is a wiring diagram.

FIG. 6 is a side elevation of a modified form of the automobile.

FIG. 7 is a top plan view thereof.

FIG. 8 is a front elevation.

FIG. 9 is a vertical section on the line 9—9 of FIG. 7.

FIG. 10 is a perspective of the base frame.

FIG. 11 is an enlarged section taken on the line 11—11 of FIG. 10.

FIG. 12 is an enlarged section taken on the line 12—12 of FIG. 10.

DESCRIPTION OF THE PREFERRED EMBODIMENT

With continued reference to the drawings, a vehicle 10 is provided having a body 11 supported by ground-engaging wheels 12. The body includes a relatively strong lightweight floor 13 constructed of any desired material such as marine plywood or the like which preferably is covered with a coating of fiber glass 14. A front bulkhead 15 and a rear bulkhead 16 are connected to opposite ends of the floor 13 with the upper ends of such bulkheads being provided with openings for a windshield 17 and a rear window 18, respectively. . A roof 19 of relatively strong reinforced molded material such as fiber glass or the like connects with the upper ends of the front and rear bulkheads 15 and 16. If desired a post 20 of fiber glass or the like may extend upwardly from the floor 13 to the roof 19 at both sides of the vehicle and intermediate the front and rear bulkheads 15 and 16 to support the central portion of the roof and add rigidity and strength thereto. Preferably front and rear seats 21 and 22 are mounted on the floor 13 on the interior of the vehicle to accommodate the operator and passengers. Front and rear doors 23 and 24 of molded fiber glass or the like enclose opposite sides of the vehicle and such doors may extend upwardly to the roof 19 and have windows therein, or such doors may extend upwardly only part of the way and be open at the top.

At the rear of the bulkhead 16 a fiberglass deck or platform 27 is provided supported by one or more braces 28 connected to the rear bulkhead 16 and extending rearwardly to a bumper 29. A rear housing 30 extends rearwardly from the bulkhead 16 and then downwardly to the deck 27 to provide a hollow compartment which may have an opening 31 normally closed by a cover 32. The cover is mounted in any desired manner, as by fasteners 33, and is removable to provide access to the compartment. Rear lights and direction signals (not shown) may be mounted in recesses molded in the housing 30 and connected in a manner to be operated when desired.

Within the compartment defined by the housing 30 a casing 34 is provided having sidewalls 35, end walls 36, and a top wall 37 of reinforced molded fiber glass construction which are integrally connected together and to the deck 27 to define a hollow totally enclosed casing for a plurality of banks of energy cells or storage batteries 38. Contact posts 39 extend upwardly through the top wall 37 for the charging and discharging of electrical energy to and from the cells 38. As illustrated two independent banks of energy cells are provided so that one bank can be receiving electrical energy while the other bank can be discharging energy, as will be described later. The walls 35, 36 and 37 are substantially thicker and stronger than the deck 27 so that in the event the vehicle is struck from behind, the deck will rupture instead of the walls and the acid within the cells will be discharged onto the street instead of into the vehicle.

At the front of the vehicle a hood 40 is connected to the front bulkhead 15 and such hood extends outwardly and downwardly to a front bumper 41 supported by one or more braces 42 connected to the floor 13. Conventional headlights and turn indicator signals (not shown) are mounted within recesses molded in the hood 40.

In order to support the body 11 a plurality of carrier tubes 43 are mounted on the front bulkhead 15 and within each of such carrier tubes is located a torsion bar 44. As illustrated in FIG. 2, each of the torsion bars 44 is provided with a clamp 45 mounted on the front bulkhead 15 in such a manner that the central portion of each of the torsion bars mounted in fixed position. The opposite ends of the torsion bars 44 are connected to links or arms 46, the opposite ends of which are connected by ball joints 47 to a wheel support 48. The wheel support includes a brakeshoe assembly and a wheel spindle (not shown) on which the wheel 12 is rotatably mounted and such wheel includes a brakedrum 49 which cooperates with the brakeshoe assembly in a conventional manner. If desired the upper link 46 may have a shock absorber connected thereto to provide a smoother ride for the vehicle. At the rear of the vehicle the drive wheels are supported in substantially the same manner as the front wheels with carrier tubes 43 and torsion bars 44 being mounted on the rear bulkhead 16.

In order to steer the vehicle, a steering wheel 52 mounted on a steering column 53 is located within the body 11 in a position accessible to the operator of the vehicle. The steering column 53 extends downwardly through the floor 13 into a steering box 54 having a steering arm 55 connected to a tie rod 56 which controls the direction of movement of the front wheels 12.

As illustrated the rear wheels are connected to each other by an axle 59 connected to a differential 60. A reversible electric motor 61 receives energy from one of the banks of energy cells 38 and drives a gearbox 62 having an output drive shaft 63 connected to the differential 60 by a universal joint 64. The speed of the motor 61 may be controlled by a foot pedal 65 connected to a rheostat 66 and the direction of rotation of such motor can be controlled by a switch 67 mounted on the front bulkhead 15.

While one of the banks of energy cells 38 is supplying electrical energy to the motor 61, it is desirable that the other bank of energy cells be charged with electrical energy and in order to do this a high-output alternator 68 is mounted on the floor 13 in any desired position, as for instance under the rear seat 22. The alternator is driven from a pulley 69 by a belt 70 which in turn is driven by a pulley 71 carried by a small internal combustion engine 72. By operating the engine 72 one of the banks of energy cells will be at least partially recharged while the other bank is discharging energy to operate the electric motor 61 and drive the vehicle.

In order to charge the energy cells when the vehicle is not in use, a transformer or battery charger 75 is provided which can be connected to an external source of electrical energy for supplying current to the energy cells.

Although a single electric motor 61 has been illustrated which drives the rear wheels through a differential and a rear axle, it is contemplated that two or more motors could be provided for driving the wheels independently.

With reference to FIGS. 6–12, a modified form of the invention is disclosed, including a body 76 of plywood and fiber glass or the like of substantially unitary construction. In this embodiment, the body is formed about a rigid frame 77 including a longitudinal horizontally disposed tubing member 78, a vertically disposed tubing member 79, and a transverse tubing member 80. The tubing members 78, 79 and 80 are constructed of very strong material such as chrome molybdenum steel and preferably are approximately 2 inches in diameter. As illustrated in FIG. 10, the tubing members 78, 79 and 80 contact each other at spaced points and are permanently welded together in the areas of contact to form a unitary high-strength, high-impact resistant frame which entirely surrounds the operator and passengers.

In this modification the automobile shown has but a single seat 81 and a steering wheel 52 mounted on a column 53 which extends through the front bulkhead 15 to a steering box 54 located about a tie rod 56. The mechanism within the steering box is of conventional construction and may include any desired mechanism, such as a worm gear and wheel, rack and pinion, or other mechanical steering arrangement.

The first bank of energy cells 38 can be located beneath a seat 81 and the second bank of energy cells 38 is disposed rearwardly of the first bank. The reversible electric motor 61 can be mounted on a platform 82 at the top of the rear energy cells and such electrical motor is adapted to drive the gearbox 62 which in turn will drive the drive shaft 63.

The longitudinal tubing member 78 preferably is provided with a coating of hard resilient material such as rubber 83 or the like so that it will function as a bumper entirely surrounding the automobile. A plurality of downwardly extending nipples 84, one adjacent each wheel, are provided on the longitudinal tubing member 78 and each of such nipples includes a valve 85 at its lower end. Preferably the tubing member 78 is filled with compressed air at approximately 150 p.s.i. which serves the dual purpose of adding strength to the tubing as well as providing a reservoir for compressed air. In the event of a flat tire, a small quantity of liquid latex can be injected into the tire after which a short length of flexible hose can be connected between the air valves 85 and the air valve and stem of the flat tire so that air under pressure can be introduced into the tire until the tire is again fully inflated.

The vertically disposed tubing member 80 is provided with an inlet 86 having a cap 87 at one end. The inlet is disposed adjacent the top of the automobile and is adapted to receive distilled water 88 which can be readily supplied to the energy cells 38 when necessary. The vertically disposed tubing member may have an outlet pipe 89 controlled by a valve 90 which can be connected to a length of flexible hose for supplying water by gravity to the energy cells, or if desired a small electric pump (not shown) could be provided for removing distilled water from the tubing member 79.

I claim:

1. An electrically operated automobile comprising a lightweight body constructed of plywood and molded fiber glass and including an enclosed battery-containing compartment having a bottom deck, said compartment being provided with an access opening; a plurality of ground-engaging wheels supporting said body, means for steering said automobile, at least one reversible electrically operated motor carried by said body, a plurality of selectively usable rechargeable energy cells permanently encased in said body in a battery casing including top, side and end walls integrally connected to each other and to said bottom deck which comprises the bottom wall of said casing, means controlling the flow of energy from said cells to said reversible motor, and means for selectively recharging said energy cells.

2. An electrically operated automobile as set forth in claim 1 where the side and end walls of said battery casing are of substantially greater strength than the bottom wall thereof.

3. An electrically operated vehicle comprising a lightweight body constructed of rigid and moldable materials, a plurality of ground-engaging wheels supporting said body, at least one seat disposed within said body, means for steering said vehicle, an electrically operated reversible motor carried by said body, a plurality of selectively usable rechargeable energy cells permanently encased by the moldable material of said body, a plurality of contact posts projecting outwardly of said energy cells, means selectively connecting said motor to certain of said contact posts, an auxiliary source of power carried by said body, electrical energy-generating means driven by said auxiliary source of power, and means connecting said generating means to other contact posts, whereby said energy cells will be nonremovably mounted in said body and certain of said cells can be recharged while other cells are discharging electrical energy to operate said motor, said body including a rigid frame of tubular construction welded together as an integral unit, said frame including a longitudinally disposed tubing member, a vertically disposed tubing member, and a transversely disposed tubing member, said longitudinally disposed tubing member having means for introducing air under pressure therein and means for discharging air under pressure therefrom, said vertically disposed tubing member having inlet and outlet means and providing a reservoir for distilled water which can be supplied to said energy cells.

* * * * *